United States Patent [19] [11] 4,133,102

Gillemot [45] Jan. 9, 1979

[54] AUTOMATIC CONNECTOR PRESSER

[75] Inventor: George W. Gillemot, Santa Monica, Calif.

[73] Assignee: John T. Thompson, Santa Monica, Calif. ; a part interest

[21] Appl. No.: 760,526

[22] Filed: Jan. 19, 1977

[51] Int. Cl.[2] .............. B23P 19/00

[52] U.S. Cl. .............. 29/750; 29/811

[58] Field of Search .............. 29/750, 751, 752, 758, 29/811, 816

[56] References Cited

U.S. PATENT DOCUMENTS

| | | | |
|---|---|---|---|
| 563,542 | 7/1896 | Allshouse | 29/816 |
| 2,722,146 | 11/1955 | Byrem | 29/751 |
| 2,784,621 | 3/1957 | Klingler | 29/751 |
| 3,075,198 | 1/1963 | Over | 29/816 |
| 3,571,888 | 3/1971 | DiFilippo | 29/751 |
| 3,611,782 | 10/1971 | Eppler | 29/751 |

*Primary Examiner*—Lowell A. Larson
*Attorney, Agent, or Firm*—Harris, Kern, Wallen & Tinsley

[57] ABSTRACT

A pressing tool for electrical connectors, or the like, including an elongated housing, an anvil carried by the housing adjacent one end thereof, a presser carried by and movable relative to the housing toward and away from the anvil along a presser path perpendicular to the anvil, an elongated handle extending longitudinally of the housing and accessible from the exterior thereof, means connecting the handle to the housing for producing longitudinal movement of the handle relative to the housing in response to lateral movement of the handle relative to the housing, and means for converting such longitudinal movement of the handle relative to the housing into movement of the presser along the presser path toward the anvil. Reversed movement of the handle is prevented until the presser has been moved a predetermined distance toward the anvil. A track means conveys successive connectors to be pressed into a pressing chamber which is so inclined relative to the track means that each connector is separated from the succeeding connector. An interceptor means prevents movement of a connector from the track means into the pressing chamber when intermittent operation is desired. The anvil is cantilevered toward the track means and the pressing chamber is open sided for easy access to a connector in the pressing chamber. With this construction, several different types of connectors may be processed with left handed and right handed orientations, without any need for attachments, or interchangeable parts.

11 Claims, 16 Drawing Figures

AUTOMATIC CONNECTOR PRESSER

BACKGROUND OF INVENTION

The present invention relates in general to a pressing tool and, more particularly, to a presser for closing such items as electrical connectors onto wires inserted into the connectors. Still more particularly, the invention contemplates a tool for transporting items to be pressed from a magazine to a pressing station by means of a carrier strip, and specifically a tape to which the items are adhesively secured. Successive items are stripped from the tape and pressed at the pressing station.

Prior art pertinent to the general field to which the invention relates includes the following U.S. Pat. Nos.

| | | | |
|---|---|---|---|
| 2,078,064 | Day | 3,539,086 | Ragard et al |
| 2,908,908 | Steinmetz et al | 3,543,987 | Obergfell et al |
| 2,922,162 | Cohn | 3,554,246 | Halstead |
| 2,946,059 | Wandel | 3,558,031 | Hillier |
| 2,979,726 | Carlzen et al | 3,623,646 | Cast et al |
| 3,099,837 | Heilman et al | 3,688,966 | Perkins et al |
| 3,208,657 | Cohn | 3,703,981 | Smith |
| 3,211,352 | Anstett | 3,707,406 | Perkins |
| 3,524,576 | Bader | 3,708,097 | Fisher |
| | | 3,854,648 | Inzoli et al |

SUMMARIES AND OBJECTS OF INVENTION

The invention may be summarized as comprising, and a primary object of the invention is to provide, a pressing tool which includes: an elongated housing having a longitudinal axis; an anvil carried by the housing adjacent one end thereof; a presser carried by and movable relative to the housing toward and away from the anvil along a presser path perpendicular to the anvil; an elongated handle extending longitudinally of the housing and accessible from the exterior thereof; means connecting the handle to the housing for producing longitudinal movement of the handle relative to the housing in response to lateral movement of the handle relative to the housing; and means for converting such longitudinal movement of the handle relative to the housing into movement of the presser along the presser path toward the anvil.

Another object of the invention is to provide a pressing tool wherein a toggle means connected to the housing, the handle and the presser converts longitudinal movement of the handle relative to the housing into movement of the presser along the presser path toward the anvil.

A further object is to provide means for preventing reversed movement of the handle until the handle has been moved relative to the housing sufficiently to move the presser a predetermined distance toward the anvil. With this construction, proper closure of each connector is assured, which is an important feature of the invention.

The invention may be further summarized as including, and an important object of the invention is to provide, a pressing tool which comprises: an elongated housing having a longitudinal axis; track means extending longitudinally of the housing for conveying successive items to be pressed from adjacent one end of the housing to adjacent the other end thereof; an anvil carried by the housing adjacent such other end thereof and inclined at an acute angle relative to the track means; a presser carried by and movable relative to the housing toward and away from the anvil along a presser path perpendicular to the anvil and inclined at an obtuse angle to the track means; and handle means carried by and movable relative to the housing for moving the presser along the inclined presser path toward and away from the inclined anvil.

With the foregoing construction, the inclined anvil and the inclination of the presser path provide an inclined pressing chamber which separates each connector, or other item, from a succeeding connector as the first connector enters the pressing chamber. Consequently, the succeeding connector does not interfere with operations performed on the first connector, including such operations as wire insertion, connector closure, and the like, which is an important feature of the invention.

Still another object of the invention is to cantilever the anvil toward the track means and to provide the pressing chamber with open sides for easy access to a connector, or other item, to be pressed in the pressing chamber.

The invention may be still further summarized as comprising, and yet another object is to provide, a tool for pressing items carried by a tape, which includes: an elongated housing; spring loaded tape take-up means located adjacent one end of the housing; pressing means adjacent the other end of the housing for pressing successive items removed from the tape; means for removing successive items from the tape adjacent the take-up means; track means for guiding items removed from the tape adjacent the take-up means to the pressing means; and means including the take-up means for transporting successive items removed from the tape along the track means to the pressing means.

An additional object of the invention is to provide an interceptor means carried by the housing adjacent the pressing chamber for preventing movement of an item from the track means into the pressing chamber when such interceptor means is in an operative position, there further being means for moving the interceptor means between operative and inoperative positions. When the interceptor means is moved back and forth between its operative and inoperative positions, items are fed from the track means into the pressing chamber intermittently. A related object is to provide means for preventing movement of the interceptor means to its operative position to provide for continuous feeding of items from the track means into the pressing chamber.

Another important object of the invention is to provide a pressing tool capable of closing different types of electrical wire connectors in either left handed or right handed orientations, without any necessity for attachments, or any necessity for interchanging parts.

A further object is to provide a ratchet type drive for the spring loaded tape take-up means which allows the operator to wind the take-up means with an oscillating motion, thereby speeding up the winding operation.

Yet another object is to provide a spring release for the tape take-up means which will not cause the winding element to spin backward, thereby preventing injury to the operator.

An additional object is to provide the housing of the track means with a retainer spring which prevents the connectors from falling out the inlet end of the track means when the magazine tape is used up. This allows the operator to completely empty the presser by using gravity to propel the remaining connectors into the pressing chamber.

The foregoing objects, advantages, features and results of the present invention, together with various other objects, advantages, features and results which will be evident to those skilled in the pressing tool art in the light of this disclosure, may be achieved with the exemplary embodiment of the invention described in detail hereinafter and illustrated in the accompanying drawings.

DESCRIPTION OF EXEMPLARY EMBODIMENT OF INVENTION

Figure 5:
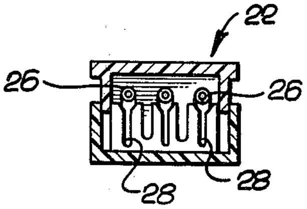
FIGS. 5 and 6 are diagrammatic sectional views respectively showing in open and closed positions an electrical wire connector adapted to be closed by the pressing tool of the invention.
Figure 6:
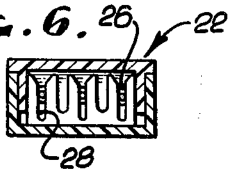
Figure 2:
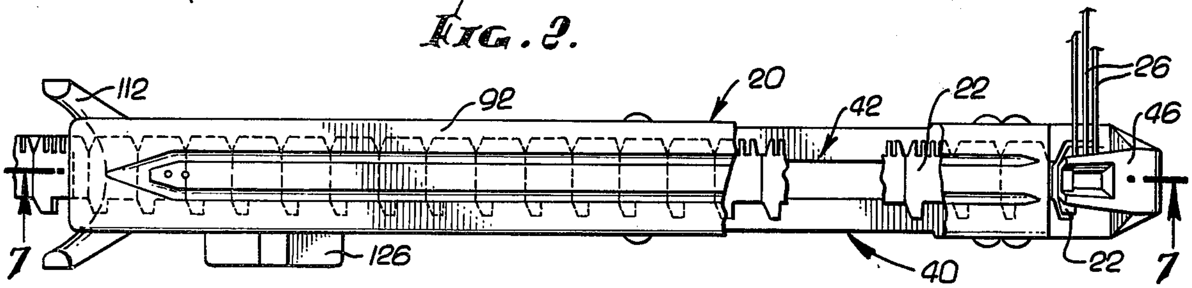
FIG. 2 is a top plan view of the pressing tool of the invention.
Figure 3:
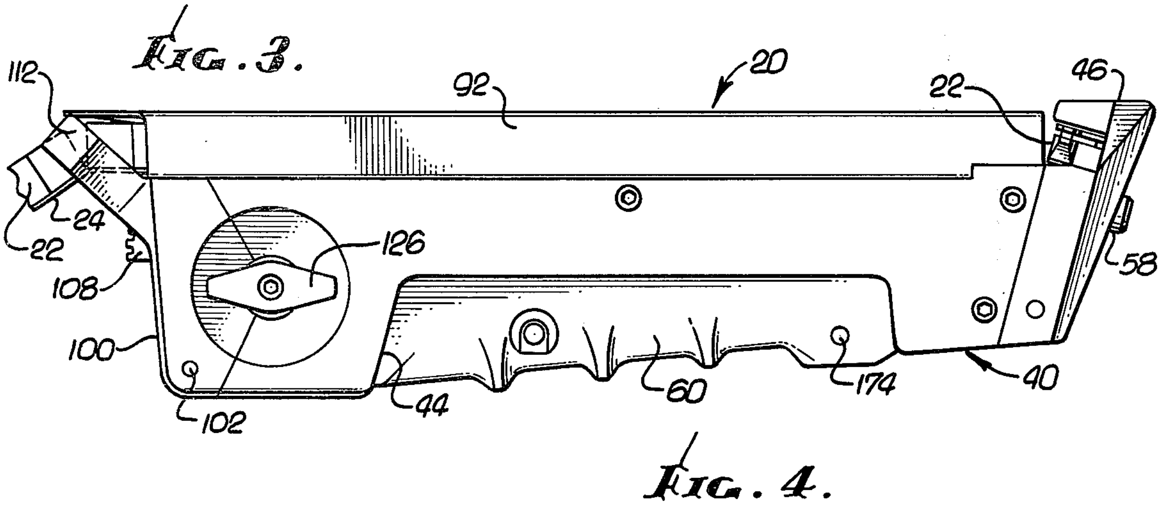
FIG. 3 is a side elevational view showing the right side of the pressing tool.

In the drawings, the pressing tool of the invention is designated generally by the numeral 20 and is adapted, for example, to press closed electrical connectors 22 adhesively carried by a tape 24, FIGS. 3, 7, 8 and 9. The electrical connectors 22 are carried by the tape 24 in side-by-side relation and are in a partially closed condition, as shown in FIG. 5, the fully closed condition being shown in FIG. 6. As shown in FIG. 5, each connector 22 is adapted to receive insulated wires 26 which, upon closure of the connector, are forced into slots 28 the edges of which penetrate the insulation to make electrical contact with the wires.

The pressing tool 20 can accommodate butt or bridge splicing, right-handed or left-handed splicers, 2 or 3 wire standard or bridging connections, and the like. The tape 24 with the connectors 22 thereon is coiled in one direction for right-handed splicers, and in the opposite direction for left-handed splicers. Appropriately marked leader sections are located at the respective ends of the tape 24.

Figure 1:
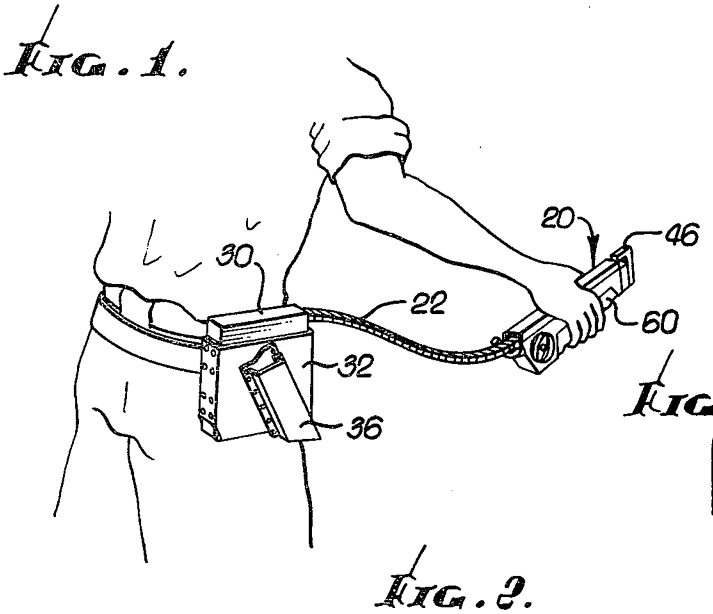
FIG. 1 is a perspective view showing a connector pressing tool of the invention in use with a connector supplying tape leading from a magazine, which magazine carries a holster for the pressing tool.

The appropriately coiled tape 24 with the connectors 22 adhesively carried thereby are placed in a box or carton 30, FIG. 1, which is insertable into a carrying case or magazine 32 which can be worn on the splicer's belt, or hung on any convenient rack. The tape 24 with the connectors 22 thereon extends from the top of the carton 30 to the pressing tool 20. The magazine 32 carries a holster 36 in which the pressing tool 20 is placed when not in use.

Figure 7:
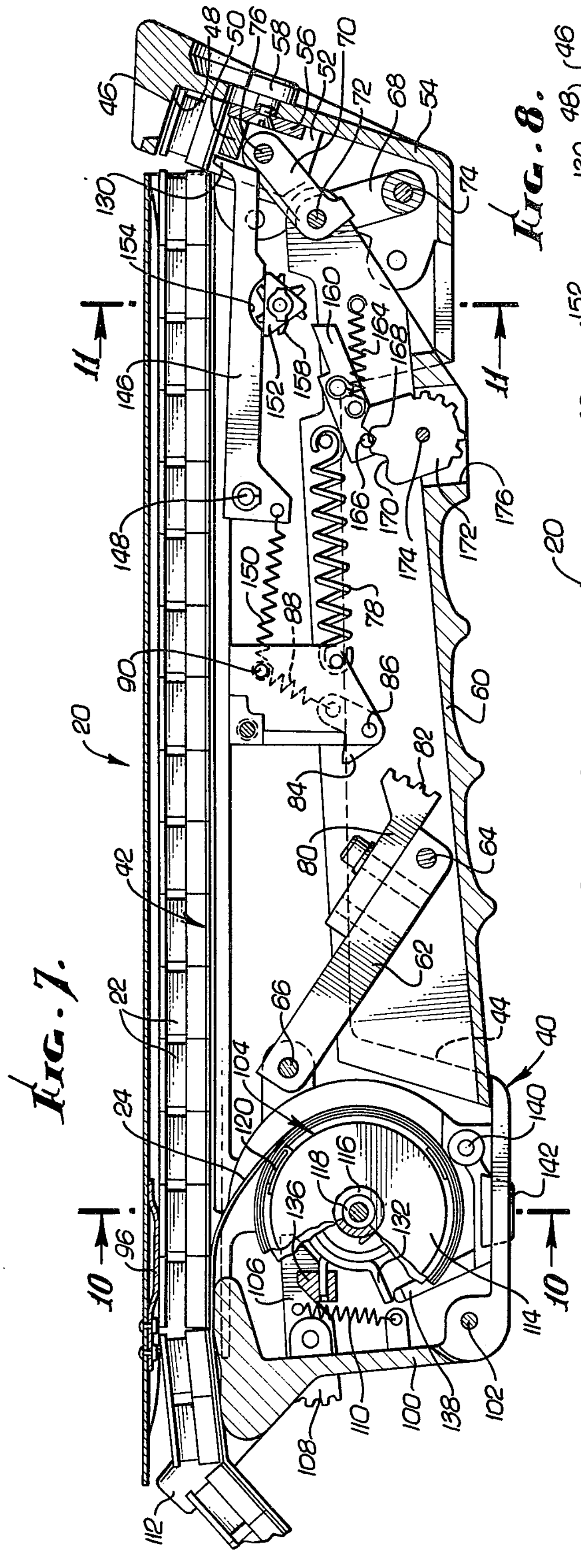
FIG. 7 is an enlarged longitudinal sectional view taken as indicated by the arrowed line 7—7 of FIG. 2, with the pressing tool in the position it occupies prior to closing a connector.
Figure 8:
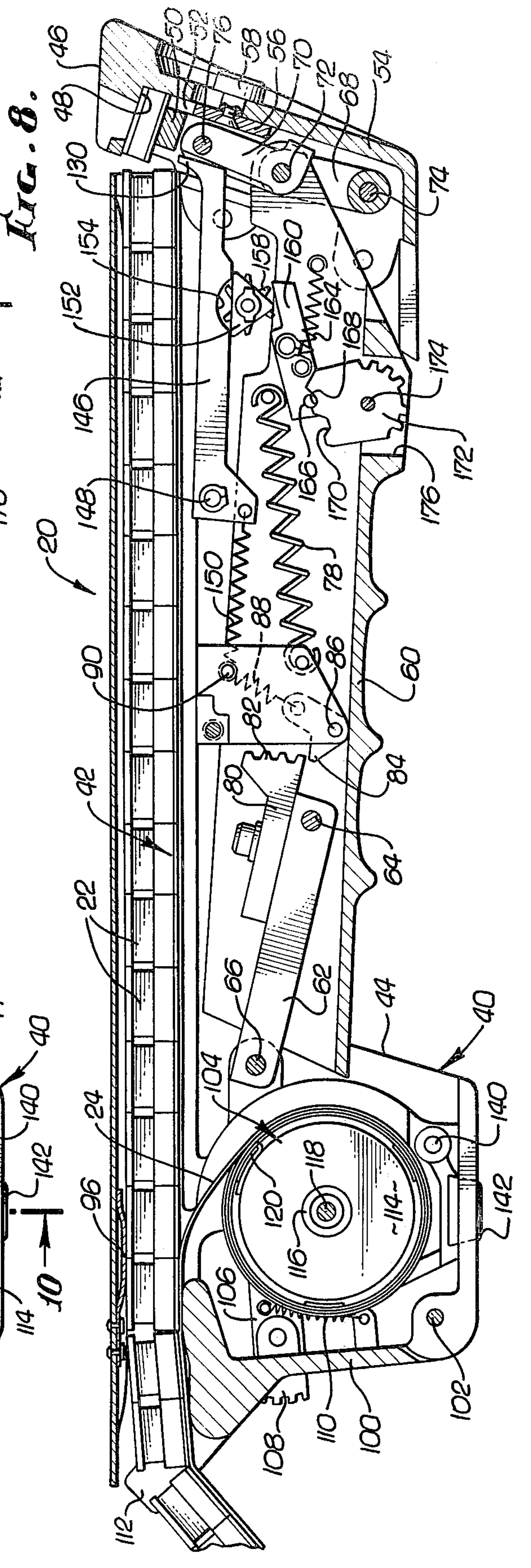
FIG. 8 is a view similar to FIG. 7, but showing the tool in the position it occupies after closing a connector.

Turning now to FIGS. 7 and 8 of the drawings in particular, the pressing tool 20 includes an elongated housing 40 provided along its "upper" longitudinal edge with a longitudinal track means 42 for successive connectors 22 removed from the tape 24 in a manner to be described hereinafter. The elongated housing 40 is provided opposite its upper longitudinal edge with a "lower" longitudinal edge having a handle opening 44 therein. The housing 40 may be regarded as having a longitudinal axis substantially parallel to its upper and lower edges. The housing 40 may also be regarded as having "inner" and "outer" ends which are its left and right ends, as viewed in FIGS. 7 and 8. The inner end of the housing 40 is the end nearest the splicer when he holds the pressing tool 20 in the manner shown in FIG. 1 of the drawings.

The housing 40 is provided at its outer end, and adjacent its upper edge, with an anvil 46 having a surface 48 inclined at an acute angle to the longitudinal axis of the housing, and particularly to the track means 42. It will be noted from FIGS. 7 and 8 in particular that the anvil 46 is cantilevered toward the track means 42 and that the space beneath the anvil is open on both sides of the housing 40, thereby providing beneath the anvil an open sided pressing chamber for easy access to a connector 22 to be pressed therein when inserting wires into the connector, which is an important feature of the invention.

A presser 50 is carried by and movable relative to the outer end of the housing 40 toward and away from the anvil surface 48 along a presser path perpendicular to the anvil surface and inclined at an obtuse angle to the longitudinal axis of the housing, and particularly at an obtuse angle to the track means 42. In FIG. 7, the presser 50 is shown at the lower end of the presser path, and in FIG. 8 it is shown at the upper end of the presser path. The presser 50 is basically U-shaped and includes laterally spaced arms 52 which slidably engage an end wall 54 of the housing 40 inclined at an obtuse angle to the longitudinal axis of the housing. The end wall 54 of the housing 40 serves to guide the presser 50 along the hereinbefore-discussed presser path. A rectangular boss 56 secured to the inner surface of the end wall 54 by a screw 58 is embraced by the arms 52 of the presser 50 and serves to restrain the presser 50 against lateral movement relative to the desired presser path.

An elongated handle 60 is disposed within and extends longitudinally of the housing 40 and is accessible through the handle opening 44. The handle 60 is channel-shaped in cross section and its lower surface is provided with transverse ribs between which the operator's fingers fit.

The handle 60 is so connected to the housing 40 and to the presser 50 that lateral movement of the handle relative to the housing toward the upper edge of the housing results in longitudinal movement of the handle relative to the housing toward the outer end of the housing, which longitudinal movement of the handle results in upward movement of the presser 50 along the presser path toward the anvil 46. This action will be clear by comparing FIG. 8 of the drawings to FIG. 7 thereof.

More particularly, a link 62 is connected at one end by a transverse pivot 64 to the handle 60 adjacent the inner end of the handle. The other end of the link 62 is pivotally connected to a portion of the housing 40 adjacent the inner end thereof by a transverse pivot 66. As will be clear by comparing FIG. 8 to FIG. 7, the link 62 causes upward movement of the inner end of the handle 60 to produce longitudinal movement of the entire handle 60 toward the outer end of the housing 40.

A toggle means interconnects the outer end of the handle 60 and the outer end of the housing 40 and converts such longitudinally outward movement of the handle 60 into upward movement of the presser 50 toward the anvil 46 to close a connector 22 in the pressing chamber. More particularly, the toggle means comprises two pivotally interconnected toggle links 68 and 70 both connected to the outer end of the handle 60 by a transverse pivot 72. The lower toggle link 68 is a U-shaped link embracing the outer end of the handle 60, while the upper toggle link 70 is disposed between the sides of the handle. The lower toggle link 68 is pivotally connected to the outer end of the housing 40 by a transverse pivot 74, while the upper toggle link 70 is pivotally connected to the arms 52 of the presser 50 by a transverse pivot 76.

As will be apparent by comparing FIG. 8 of the drawings to FIG. 7 thereof, upward movement of the handle 60 toward the upper edge of the housing 40 results in longitudinal movement of the handle toward the outer end of the housing 40 as the result of the action of the link 62. Such outward longitudinal movement of the handle 60 results in straightening of the toggle links 68 and 70, as will be seen in FIG. 8, to displace the presser 50 upwardly toward the anvil surface 48 to close a connector 22 in the pressing chamber between the presser 50 and the anvil 46, the closed position of the connector being shown in FIG. 6 of the drawings.

The foregoing toggle action represents an important feature in the sense that it converts a light upward force applied to the handle 60 into longitudinal handle travel which, in turn, actuates the toggle links 68 and 70 to displace the presser 50 toward the anvil 46 with a high pressing force.

The pressing tool 20 includes means for preventing reversed movement of the handle 60 until the handle has been moved relative to the housing 40 a sufficient distance to straighten the toggle links 68 and 70 to the extent shown in FIG. 8 of the drawings. In other words, reversed movement of the handle 60 is prevented until the presser 50 has been moved toward the anvil 46 a predetermined distance, i.e., the precise distance necessary to close a connector 22 in the pressing chamber properly, which is an important feature. The handle 60 is biased toward its original position, FIG. 7, by a tension spring 78 connected at one end to the housing 40 and at its other end to the handle. As shown in FIGS. 7 and 8, the foregoing handle-reversal-preventing means comprises a ratchet member 80 carried by the link 62 and having teeth 82 engageable with a pawl 84 mounted on a portion of the housing 40 by a transverse pivot 86. The pawl 84 is biased toward the position shown in FIGS. 7 and 8 by a tension spring 88 connected to the pawl at one end and to a spring anchor 90 on the housing 40 at its other end. The ratchet teeth 82 and the tooth of the pawl 84 are so shaped that the ratchet member 80 cannot reverse its direction of motion relative to the pawl 84, from the counterclockwise direction, until all of the ratchet teeth 82 have passed the tooth of the pawl. Only then can the direction of motion of the ratchet member 80 to a clockwise direction be reversed. This ensures that the presser 50 will move precisely the desired predetermined distance toward the anvil 46, which is an important feature since it assures proper closing of a connector 22 in the pressing chamber between the presser 50 and the anvil 46.

Figure 15:
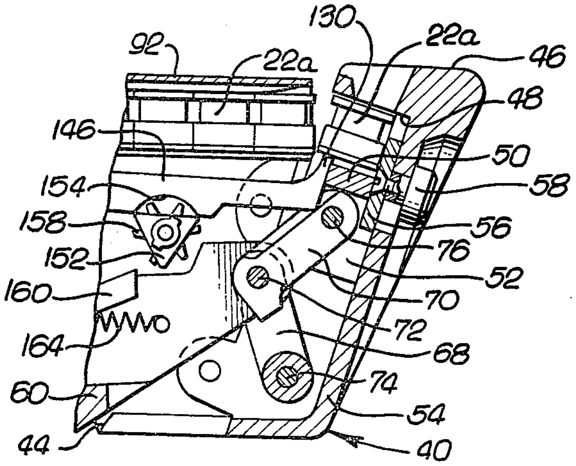
FIG. 15 is a view similar to the right end of FIG. 7, but showing an alternative position for one part.

It will be noted in FIGS. 7 and 8 of the drawings that the screw 58 for securing the boss 56 to the end wall 54 of the housing 40 projects through a slot in the end wall which extends upwardly and downwardly so that the vertical position of the boss 56 relative to the end wall 54 can be adjusted. In FIGS. 7 and 8, the boss 56 is in its lowermost position so as to accommodate a connector 22 of maximum width. Turning to FIG. 15 of the drawings, the boss 56 has been adjusted to its uppermost position to act as a stop for a narrower connector 22*a*. In all other respects, the operation of the arrangement of FIG. 15 is the same.

Figure 10:
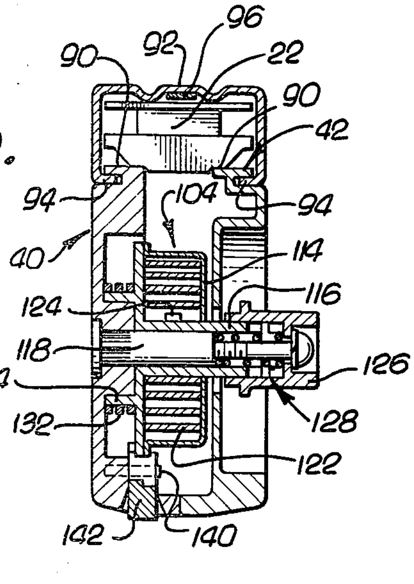
FIGS. 10 and 11 are transverse sectional views respectively taken along the arrowed lines 10—10 and 11—11 of FIG. 7.
Figure 11:
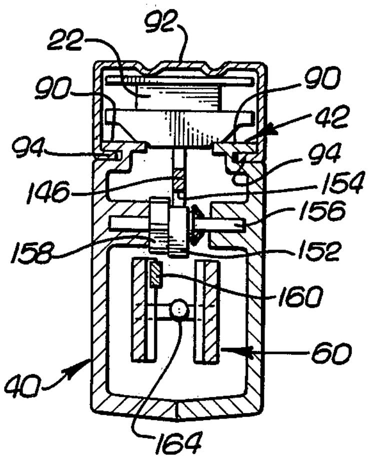

Considering the track means 42, it includes, as best shown in FIGS. 10 and 11, two laterally spaced tracks 90 which extend longitudinally of the upper edge of the housing 40 and along which the connectors 22 are slidable after they have been stripped from the tape 24 in a manner to be described hereinafter. The track means also includes a longitudinally extending cover 92 which encloses the connectors 22 on the tracks 90. Again as best shown in FIGS. 10 and 11, the cover 92 has the configuration of an inverted channel and is provided with inturned lower flanges 94 which extend longitudinally of the cover and which are disposed in complementary grooves in the housing 40 adjacent the tracks 90. With this construction, the cover 92 is slidably detachable from the housing 40 by moving the cover longitudinally in a direction extending away from the outer or anvil end of the tool 20. Obviously, the cover 92 is installed by sliding it in the opposite direction.

Figure 9:
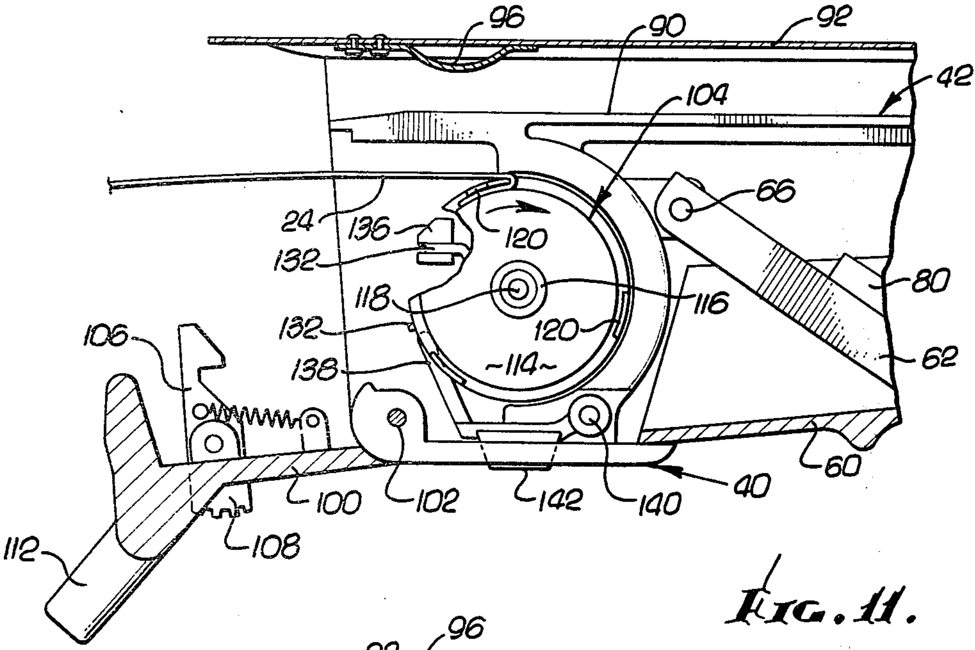
FIG. 9 is a view similar to the left end of FIG. 7, but showing various parts in different positions.

As shown in FIGS. 7, 8 and 9, the upper wall of the cover 92 carries a connector retainer spring 96 adjacent the inlet end of the track means 42, i.e., adjacent the inner end of the tool 20. This retainer spring prevents connectors 22 from sliding out the inlet end of the track means 42 after stripping from the tape 24, even if the pressing tool 20 is held with its outer end uppermost.

The pressing tool 20 is provided at its inner or rearward end with a hinged access panel 100 carried by a transverse hinge pin 102 adjacent the lower edge of the housing 40. The hinged panel 100 may be pivoted downwardly, as shown in FIG. 9, for access to a spring loaded tape take-up reel means 104 which will be described in more detail hereinafter. The hinged access panel 100 is normally latched closed by a pivoted latch 106 adapted to be released by an actuator 108 and biased toward its latching position by a spring 110.

Figure 4:
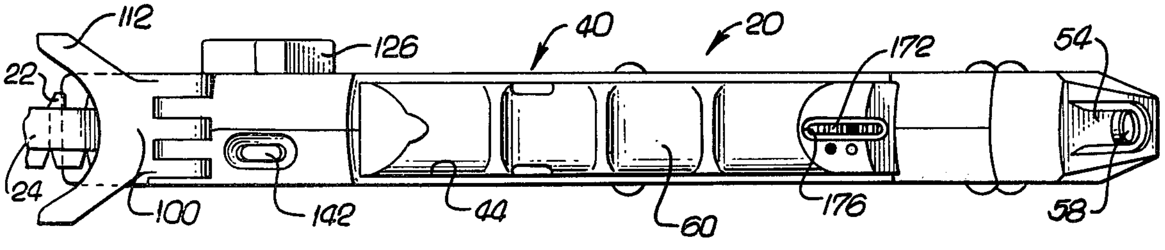
FIG. 4 is a bottom plan view of the pressing tool.

An important feature is that the hinged access panel 100 carries a fork or yoke 112 which, when the access panel is closed, registers with the inlet end of the track means 102 to serve as a guide for the connectors 22 on the tape 24 entering the inlet end of the track means 42. The yoke 112, which is substantially semi-circular, as best shown in FIG. 4, serves to guide the tape 24 with the connectors 22 thereon into the inlet end of the track means 42 smoothly even if the pressing tool 20 is held at a substantial angle laterally with respect to the incoming tape 24 and connectors 22.

The spring loaded take-up reel or reel means 104 includes a drum 114 which, as best shown in FIG. 10, is rotatably mounted on a tubular shaft 116, the latter, in turn, being rotatably mounted on a fixed axle 118 carried by the housing 40. The drum 114 carries circumferentially spaced, longitudinally extending tabs 120 under which the leading end of the tape 24 can be tucked, as best shown in FIGS. 7, 8 and 9 of the drawings. By turning the drum 114 in the clockwise direction, as viewed in FIGS. 7, 8 and 9, the tape 24 is stripped from successive connectors 22, which move over the leading end of the track means 42 onto the track means, as will be clear from FIGS. 7 and 8 in particular.

The drum 114 contains a spiral spring 122, FIG. 10, the outer end of which is suitably connected to the drum and the inner end of which is connected to a tab 124 on the tubular shaft 116. A drive knob 126 is carried by and rotatable relative to the outer end of the tubular shaft 116, being rotationally engageable with the tubular shaft 116 in the clockwise direction only, as viewed in FIGS. 3, 7, 8 and 9, by a 1-way clutch 128, FIG. 10. By turning the drive knob 126 in the clockwise direction, after pressing the drive knob inwardly to engage it rotationally with the tubular shaft 116 through the 1-way clutch 128, the tape 24 may be wound on the drum 114 to strip connectors 22 from the tape 24 and propel them along the track means 42 until the track means is filled with the connectors, the first one either engaging the anvil 46, or an interceptor means 130, FIGS. 12 and 13, to be described hereinafter.

Figure 16:
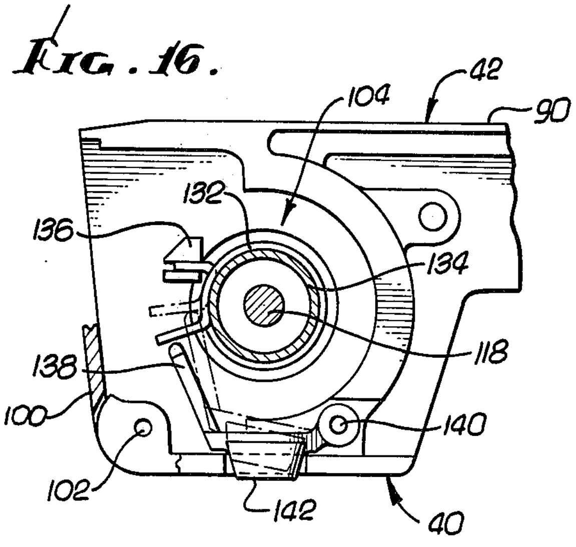
FIG. 16 is a view similar to the left end of FIG. 7, but showing parts in different positions.

After the track means 42 has been filled with connectors in the foregoing manner, the drive knob 126 is turned clockwise a few more times to wind up the spring 122 in the drum 114. The drum is held in its wound position by a coil spring 132, FIG. 10, wound on a hub 134 of the tubular shaft 116. One end of the spring 132 is anchored by a stop 136, FIG. 16, which also serves as a latch keeper for the latch 106. The other end of the spring 132 engages a stop 138 mounted on the housing 40 by a transverse pivot 140 and carrying an actuator button 142. By pushing inwardly on the actuator 142, the stop 138 is moved toward the stop 136 to slacken the spring 132 and thus release the hub 134. This permits the spring 122 in the drum 114 to unwind, thereby preventing injury to the operator when he wishes to remove tape 24 wound on the drum 114.

Figure 12:
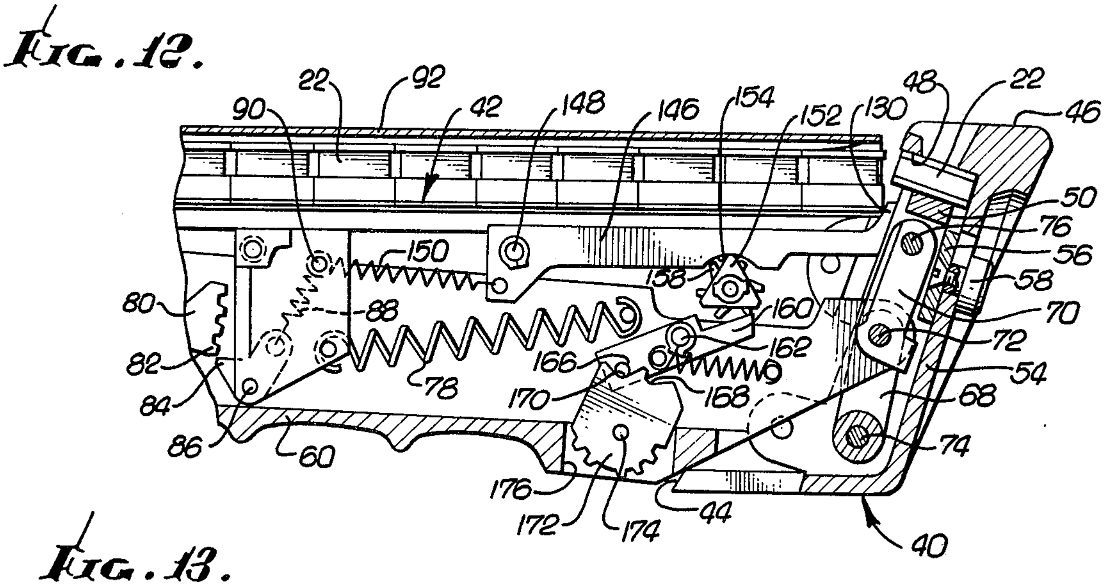
FIG. 12 is a view similar to the right end of FIG. 8, but showing parts in different operating positions.
Figure 13:
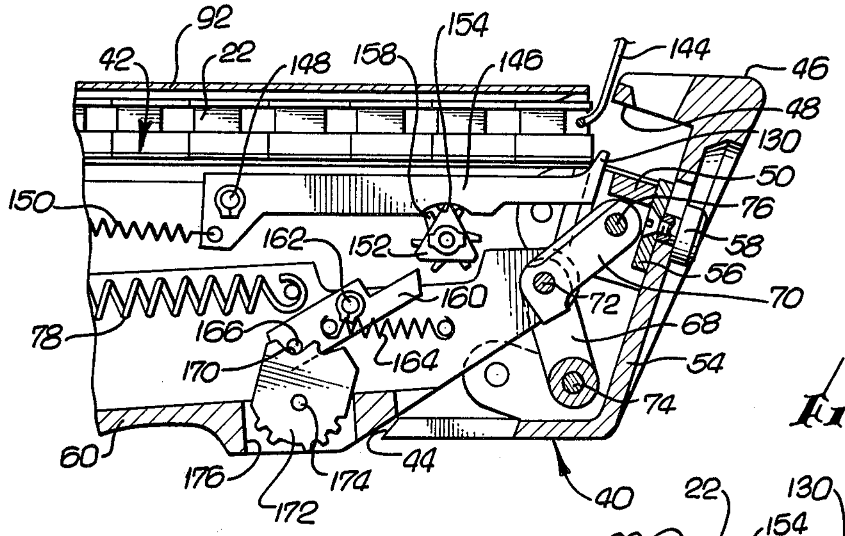
FIG. 13 is a view similar to the right end of FIG. 7, but showing parts in different operating positions.
Figure 14:
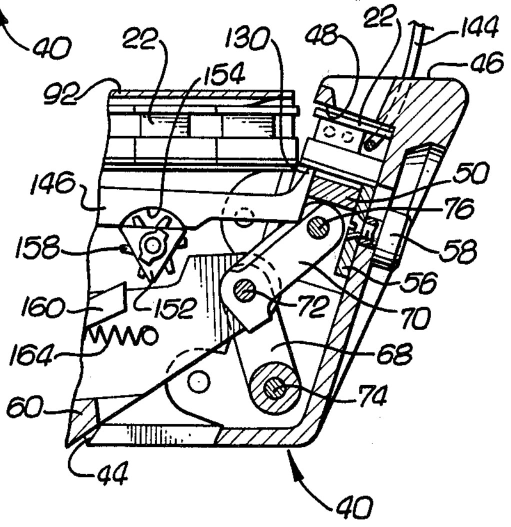
FIG. 14 is a view similar to FIG. 13, but showing parts in different operating positions.

The interceptor means 130 is movable upwardly and downwardly between a lower, inoperative position, FIGS. 7, 8, 14 and 15, and an upper, operative position, FIGS. 12 and 13. When the interceptor means is in its inoperative position, as shown in FIGS. 7 and 8, for example, a succeeding connector 22 enters the pressing chamber as soon as the preceeding connector has been closed and removed. Such continuous operation is utilized in butt splicing.

In bridge splicing, an intermitent mode of operation is used. In other words, as shown in FIGS. 12 and 13, the interceptor means 130 detains the connectors 22 in the track means 42 until the preceeding connector has been removed from the pressing chamber. By actuating the handle 60 once, as will be explained, the interceptor means 130 is moved to its inoperative position to permit the next connector 22 to slide into the pressing chamber. This intermitent mode of operation is particularly important when a left-handed splicer is making a bridge connection, as shown in FIG. 13, since the bridge wire 144, FIG. 13, must be inserted under the anvil 46 before the connector 22 is permitted to enter the pressing chamber.

Considering the interceptor means 130 in more detail, it comprises a pawl at one end of a lever 146 the other end of which is mounted on the housing 40 by a transverse pivot 148. A spring 150 connected at one end to the lever 146 and at its other end to the spring anchor 90 biases the pawl 130 toward its retracted, inoperative position, shown in FIGS. 7 and 8 in particular.

The spring 150 biases the lever 146 downwardly against a cam 152 in the shape of an equilateral triangle, the lower edge of the lever 146 having an arcuate notch 154 adapted to receive each apex of the cam. When the cam 152 is in the position shown in FIGS. 7, 8, 14 and 15, the interceptor pawl 130 is in its inoperative position. When an apex of the cam 152 is in the notch 154, as shown in FIGS. 12 and 13, the interceptor pawl 130 is extended upwardly into its operative position.

As best shown in FIG. 11, the triangular cam 152 is fixed on a shaft 156 rotatable relative to the housing 40 and also having fixed thereon a ratchet wheel 158. On each actuation of the handle 60, a pawl 160 carried thereby either misses the ratchet wheel 158 to leave the triangular cam 152 continuously in the position of FIGS. 7, 8, 14 and 15, or the pawl 160 engages the ratchet wheel 158 to rotate the triangular cam 152 1/6th of a revolution. In the latter event, one actuation of the handle 60 causes the triangular cam 152 to lift the interceptor pawl 130, FIGS. 12 and 13, and the next actuation of the handle 60 lowers the interceptor pawl 130 into its inoperative position. The pawl 160 is pivotally mounted on the handle 60 at 162 and is biased in the counter-clockwise direction by a spring 164. A pin 166 on the pawl 160 is receivable in either a notch 168, or a notch 170, in a serrated actuator 172 mounted on the handle 60 by a pivot pin 174 and accessible to the operator through a slot 176.

For continuous feeding of connectors to the pressing chamber, the actuator 172 is positioned as shown in FIGS. 7 and 8, with the pawl pin 166 in the notch 168. Under such conditions, each time the handle 60 is actuated, the pawl 160 misses the ratchet wheel 158, thereby preventing rotary movement of the triangular cam 152 from the position shown in FIGS. 7 and 8. Consequently, the interceptor pawl 130 is prevented from being displaced upwardly into its operative position.

For intermittent feeding of connectors to the pressing chamber, the actuator 172 is pivoted into the position shown in FIGS. 12 and 13, wherein the pawl pin 166 is in the notch 170. Under such conditions, each time the handle 60 is actuated, the pawl 160 engages a tooth on the ratchet wheel 158 to turn the triangular cam 152 1/6th of a revolution. Consequently, one time the handle 60 is actuated, the cam 152 is turned into the position shown in FIGS. 12 and 13 to hold the interceptor pawl 130 in its operative position to detain the connectors in the track means 42. The next time the handle 60 is actuated, the triangular cam 152 is turned another 1/6th of a revolution into the position shown in FIGS. 7, 8, 14 and 15, wherein the interceptor pawl lever 146 engages one side of the cam to maintain the interceptor pawl 130 in its lower, inoperative position. Thus, one actuation of the handle 60 will result in detaining the connectors 22 in the track means 42, and the next actuation of the handle will release a connector into the pressing chamber. If continuous feeding of connectors to the pressing chamber is desired, the actuator 172 can be pivoted back to the position shown in FIGS. 7 and 8.

Although an exemplary embodiment of the invention has been disclosed for illustrative purposes, it will be understood that various changes, modifications and substitutions may be incorporated in such embodiment without departing from the invention as defined by the claims hereinafter appearing.

I claim as my invention:

1. In a pressing tool, the combination of:

(a) an elongated housing having a longitudinal axis;

(b) an anvil carried by said housing adjacent one end thereof and inclined at an acute angle relative to said longitudinal axis;

(c) a presser carried by and movable relative to said housing toward and away from said anvil along a presser path perpendicular to said anvil and inclined at an obtuse angle to said longitudinal axis;

(d) an elongated handle within and extending longitudinally of said housing and accessible from the exterior thereof;

(e) means mounting said handle in said housing for producing longitudinal movement of said handle relative to said housing in response to lateral movement of said handle relative to said housing; and (f) means for converting such longitudinal movement of said handle relative to said housing into movement of said presser along said presser path toward said anvil.

2. In a pressing tool, the combination of:

(a) an elongated housing having a longitudinal axis and having a handle opening in a first longitudinal edge thereof;

(b) an anvil carried by said housing adjacent a first end of said housing and adjacent a second longitudinal edge thereof, said anvil being inclined at an acute angle to said longitudinal axis;

(c) a presser carried by and movable relative to said housing toward and away from said anvil along a presser path perpendicular to said anvil and inclined at an obtuse angle to said longitudinal axis;

(d) an elongated handle within and extending longitudinally of said housing and accessible through said handle opening and having a first end adjacent said first end of said housing and a second end adjacent a second end of said housing;

(e) a first link pivotally connected at one end to said housing adjacent said second end of said housing, and pivotally connected at its other end to said handle adjacent said second end of said handle; and (f) toggle means comprising two pivotally interconnected toggle links pivotally connected to said handle adjacent said first end of said handle, one of said toggle links being pivotally connected to said housing adjacent said first end of said housing, and the other of said toggle links being pivotally connected to said presser.

3. A pressing tool as defined in claim 2 including means for preventing reversed movement of said handle until said handle has been moved relative to said housing a sufficient distance to straighten said toggle means.

4. A pressing tool according to claim 2 including track means extending longitudinally of said housing for conveying successive items to be pressed from a position adjacent said second end of said housing to a position between said anvil and said presser.

5. In a tool for pressing items carried by a tape, the combination of:

(a) an elongated housing;

(b) spring loaded tape take-up means located adjacent one end of said housing;

(c) pressing means adjacent the other end of said housing for pressing successive items removed from the tape;

(d) means for removing successive items from the tape adjacent said take-up means;

(e) track means for guiding items removed from the tape adjacent said take-up means to said pressing means; and (f) means including said take-up means for transporting successive items removed from the tape along said track means to said pressing means.

6. A pressing tool as defined in claim 5 including ratchet means for winding said take-up means.

7. A pressing tool according to claim 5 including means for releasing the spring loading of said take-up means.

8. In a pressing tool, the combination of:

(a) an elongated housing;

(b) track means extending longitudinally of said housing for conveying successive items to be pressed from adjacent one end of said housing to adjacent the other end thereof;

(c) an anvil carried by said housing adjacent said other end thereof and inclined at an acute angle relative to said track means;

(d) a presser carried by and movable relative to said housing toward and away from said anvil along a presser path perpendicular to said anvil and inclined at an obtuse angle to said track means; and (e) handle means carried by and movable relative to said housing for moving said presser along said presser path toward and away from said anvil.

9. A pressing tool as set forth in claim 8 wherein said track means includes a longitudinally extending cover which is slidably detachable from said housing by moving said cover longitudinally in a direction extending from adjacent said other end of said housing to adjacent said one end thereof.

10. In a pressing tool, the combination of:

(a) an elongated housing;

(b) track means extending longitudinally of said housing for conveying successive items to be pressed from adjacent one end of said housing to adjacent the other end thereof;

(c) a cantilevered anvil carried by said housing adjacent said other end thereof and substantially aligned with and extending toward said track means and providing an open sided pressing chamber for easy access to an item to be pressed therein;

(d) a presser carried by and movable relative to said housing toward and away from said anvil along a presser path perpendicular to said anvil; and (e) actuating means carried by and movable relative to said housing for moving said presser along said presser path toward and away from said anvil.

11. A pressing tool as defined in claim 10 wherein said actuating means includes:

(a) an elongated handle within and extending longitudinally of said housing and accessible from the exterior thereof;

(b) means mounting said handle in said housing for producing longitudinal movement of said handle relative to said housing in response to lateral movement of said handle relative to said housing; and (c) means for converting such longitudinal movement of said handle relative to said housing into movement of said presser along said presser path toward said anvil.

* * * * *